INVENTORS T. C. ANDERSON
J. F. INGLE
BY Alfred J. Steinmetz
ATTORNEY

June 23, 1970 T. C. ANDERSON ET AL 3,517,306
SIGNAL REFLECTION TYPE FAULT LOCATION SYSTEM UTILIZING A LOW
FREQUENCY TEST SIGNAL WITH TEST SIGNAL CANCELLATION
IN SIGNAL DISPLAY APPARATUS
Filed June 25, 1968 2 Sheets-Sheet 2
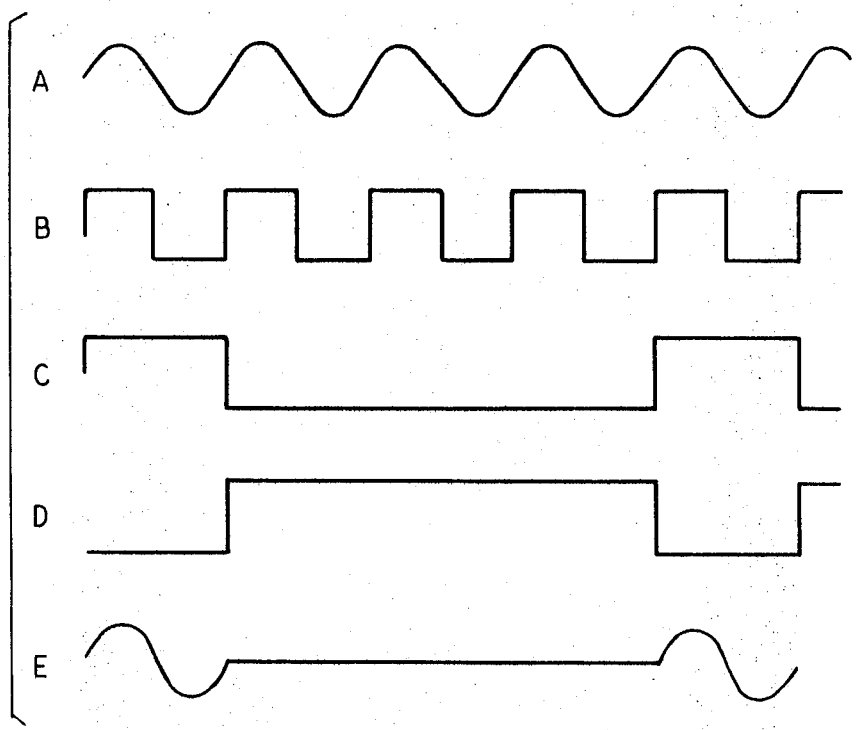
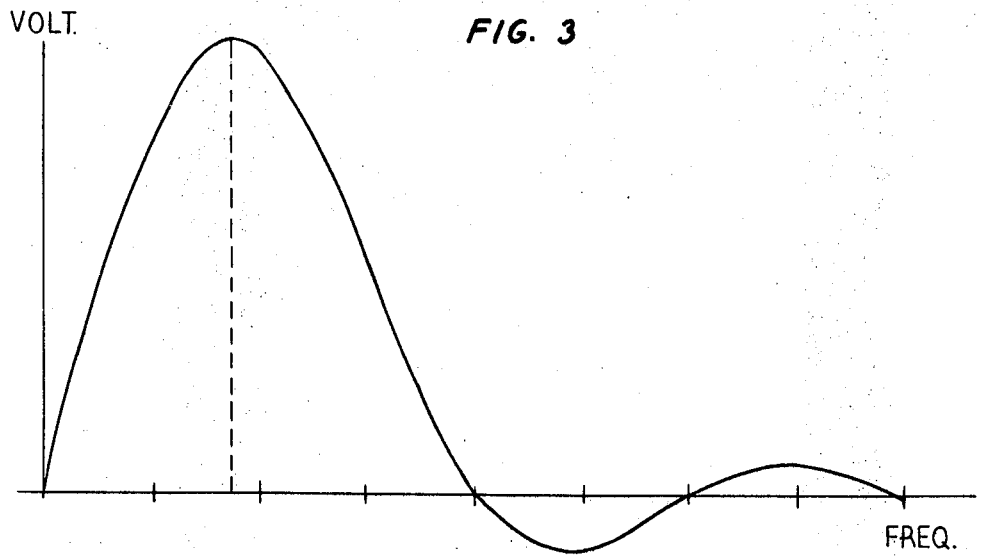

United States Patent Office 3,517,306
Patented June 23, 1970

3,517,306
SIGNAL REFLECTION TYPE FAULT LOCATION SYSTEM UTILIZING A LOW FREQUENCY TEST SIGNAL WITH TEST SIGNAL CANCELLATION IN SIGNAL DISPLAY APPARATUS
Theodore C. Anderson, Middletown, and James F. Ingle, Fair Haven, N.J., assignors to Bell Telephone Laboratories, Incorporated, Murray Hill, N.J., a corporation of New York
Filed June 25, 1968, Ser. No. 739,847
Int. Cl. G01r 31/11
U.S. Cl. 324—52            3 Claims

ABSTRACT OF THE DISCLOSURE

A signal reflection type fault location system utilizes a test signal having a periodically recurring single-cycle sinusoidal waveform. This particular test signal permits the testing of coil-loaded tranmission lines, as well as unloaded transmission lines, by concentrating the test signal energy in a frequency range readily transmitted by the transmission line. The test signal is applied to a bridge network including the transmission line under test and an artificial transmission line having electrical characteristics identical to those of the transmission line under test. The differences in the signal reflection response of the transmission line under test to the test signal from that of the artificial transmission line are displayed and indicate the location and nature of faults in the transmission line under test.

FIELD OF THE INVENTION

Figure 1:
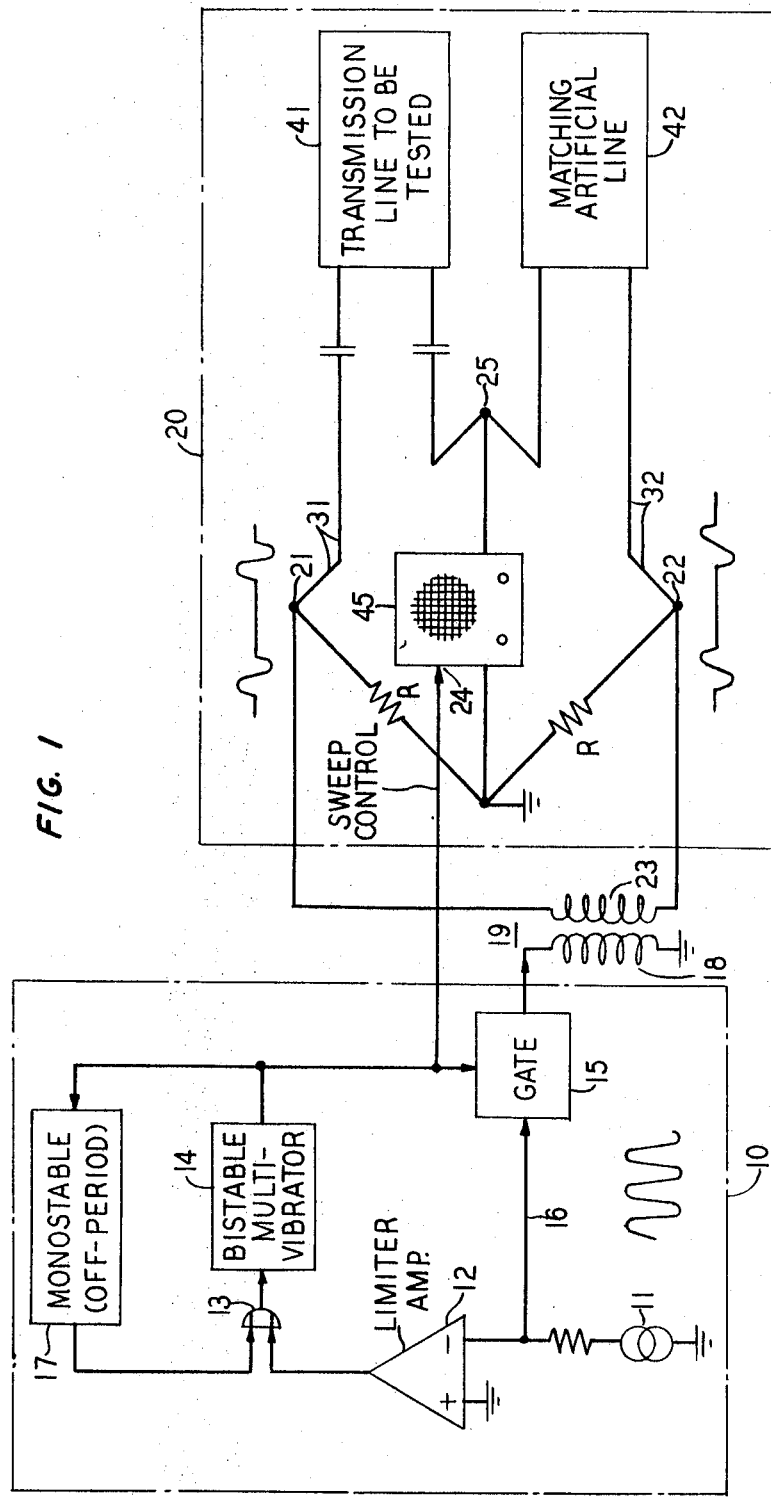

This invention relates to transmission line testing apparatus and more particularly to fault location systems of the signal reflection type to locate faults in both coil-loaded and unloaded transmission lines.

BACKGROUND OF THE INVENTION

A typical signal reflection type fault location system locates faults in transmission lines by applying a DC pulse signal to the transmission line under test and observing the return time of reflected portions of that pulse. These reflections are the result of fault-caused discontinuities in the characteristic impedance of the transmission line.

This testing method utilizing DC pulses is not applicable to the testing of telephone transmission lines which are inductively loaded with load coils. The load coils cause sharp discontinuities in the characteristic impedance of the transmission line and hence reflect portions of the incident pulse signals. These reflections are generally not distinguishable from fault-caused reflections. The reflected portion of the pulse signal due to the first load coil encountered by the pulse signal is often sufficient in amplitude and duration to screen all the subsequent reflections occurring in the transmission line. Hence accurate fault detection is limited in distance along the transmission line by the location of the first load coil therein.

The aforementioned difficulties in the detection of faults in coil-loaded transmission lines may be avoided in part by utiliznig a test signal whose fundamental and harmonic energy components are concentrated in a frequency range which is transmitted relatively easily by the coil-loaded transmission line. With this frequency distribution of test signal energy components, the test signal can probe the entire length of the transmission line for fault caused discontinuities in its characteristic impedance.

One test method which utilizes signal reflection techniques to locate faults in coil loaded transmission lines is disclosed by W. Langraf in Pat. 3,281,674, issued Oct. 25, 1966. Langraf excites the coil-loaded transmission line under test with a damped sinusoidal test signal whose fundamental and harmonic energy components are concentrated within a frequency range transmitted relatively easily by the coil-loaded transmission line. By thus concentrating the test signal energy in this frequency range, (i.e., the pass bandwidth of the coil-loaded transmission line) the test signal is transmitted along the entire length of the transmission line with little distortion, and test signal reflections due to the load coils are minimized. The distance to a detected fault is determined by timing the fault caused test signal reflections relative to the time of transmission of the initially launched test signal.

However, the Landgraf fault locating system has several limitations to its ability to accurately locate faults. One limitation is that each load coil does induce a test signal reflection in addition to those caused by other transmission line discontinuities. An additional limitation is that the signal detection apparatus provided to display reflected portions of the test signal also displays the initially transmitted test signal. Hence fault-caused discontinuities relatively close to the test station from whence the test signals are launched cannot be accurately detected since the transmitted test signal and reflected portions of the test signal may overlap considerably with the fault induced signal reflection. In addition to these limitations, the damped sinusoidal test signal waveform used by Landgraf is relatively difficult to generate.

The Landgraf fault locating system is further limited in not being suitable for applications in testing unloaded transmission lines. The low frequency of the damped sinusoidal test signal and its high transmission velocity in an unloaded transmission line causes it to overlap with the reflected portion of the test signal on transmission lines of up to several miles in length. Hence a fault location cannot be accurately determined on relatively short unloaded transmission lines.

It is therefore an object of the present invention to detect and locate faults in both coil-loaded and unloaded transmission lines without limitation with respect to the fault location.

It is another object to utilize a readily generated test signal which concentrates the fundamental and substantially all the harmonic energy components of the test signal within the pass band of the coil-loaded trasmission line.

SUMMARY OF THE INVENTION

Hence in accordance with the present invention, the above objectives are achieved using a signal reflection type fault location system to test telephone transmission lines by cancelling all of the transmitted and reflected test signals except signal reflections due to actual fault induced characteristic impedance discontinuities in the transmission line. The fault location system comprises a bridge circuit configuration wherein either a coil-loaded or an unloaded transmission line connected in one test ratio arm is balanced against an artificial transmission line with identical electrical characteristics connected in the adjacent test ratio arm of the bridge. The bridge circuit is excited by a test signal comprising a periodically recurring single-cycle sine waveform having a sinusoidal frequency at the midpoint of the pass band of the transmission line. The single-cycle sine waveform is periodically repeated at a low repetition rate. An oscilloscope in the detection circuit of the bridge records and times the asymmetrical test signal reflections due to disagreements between the signal reflections of the artificial transmission line and of the transmission line. The particular single-cycle sine wave function used as a test signal permits the concentration of test signal energy at the midpoint of the pass band of the transmission line and of the load coils, if included. Hence the test signal is readily transmitted by the transmission line without significant distortion.

A feature of the invention is the utilization of polarity inversion of the test signals as respectively applied to the telephone transmission line and the artificial transmission line. Due to this polarity inversion, only the test signal reflections responding to discontinuities in the telephone transmission line which are not matched by a similar discontinuity in the artificial transmission line are displayed by the detector.

DRAWINGS

Many additional objects, advantages, and features of the invention will become readily apparent upon reference to the following detailed specification and the accompanying drawings describing a particular embodiment of the invention wherein:

FIG. 1 is a block diagram of a particular embodiment of a fault locating system utilizing the invention; and FIGS. 2 and 3 represent, respectively, the test signal waveforms and the frequency distribution of the test signal's fundamental and harmonic energy components.

DETAILED EMBODIMENT

The fault location test system utilizes a test signal with its fundamental and harmonic energy components concentrated in the pass band of a transmission line under test. The test signal is applied to the transmission line and the signal reflections induced therein by faults in the line are used to locate the faults. This test signal traverses the entire transmission line maintaining a useful signal amplitude. By using an artificial transmission line in a balancing arrangement connected with the transmission line, all signal reflections except those due to faults may be advantageously canceled.

The fault location test system shown in FIG. 1 includes a test signal source 10 to generate a test signal comprising a periodically recurring single-cycle sine waveform such as is shown by waveform E in FIG. 2. Opposite polarities of this test signal, shown as waveforms 1 and 2 in FIG. 1, are applied respectively to the bridge nodes 21 and 22 of the bridge network 20. The test ratio arms 31 and 32 of the bridge network contain respectively the coil-loaded or unloaded transmission line 41 under test and the artificial transmission line 42. The artificial transmission line 42 has electrical characteristics which match the known electrical characteristics of the transmission line 41 to be tested. Because the test signal waveforms 1 and 2 as applied to the bridge nodes 21 and 22 are of opposite polarity, the transmitted test signal and the reflected components of the test signal due to the known electrical characteristics in the transmission line 41 and the artificial line 42 cancel and hence do not unbalance the bridge network 20. These signals are not displayed by the oscilloscope detector 45. Only the signal reflections due to a fault caused characteristic impedance discontinuity in the transmission line 41 which is not matched by a corresponding characteristic impedance discontinuity in the artificial line 42 are displayed on the oscilloscope detector 45 of the bridge network 20. The time duration between the application of the test signal to the bridge network 20 and the arrival of the signal reflection at the detector 45 is measured in order to locate the fault.

The sinusoidal waveforms of the test signal are generated by a sinusoidal signal generator 11. The frequency of the signal generator 11 is preferably in the midfrequency region of the pass bandwidth of the transmission line 41. This frequency is selected to secure an advantageous frequency distribution of the fundamental and harmonic energy components of the test signal, as is described subsequently. The sinusoidal signal generator 11 may comprise an oscillator or any other suitable periodic signal generator capable of generating an accurate sinusoidal waveform such as waveform A in FIG. 2.

The sinusoidal signal output of the signal generator 11 is applied to a high gain limiter amplifier 12 having a bipolar pulse signal output. The bipolar pulse signal output is derived from the sinusoidal signal input which is highly amplified and clipped in amplitude. The bipolar pulse output of the high gain limiter amplifier 12, shown as waveform B in FIG. 2, hence changes polarity in synchronism with the positive and negative zero crossing of the applied sinusoidal signal. The amplifier 12 preferably comprises a differential amplifier with one input constrained at a reference potential and having a very high gain. The limiter portion may comprise any suitable signal amplitude clipping arrangement.

The bipolar pulse output of the limiter amplifier 12 is applied to an OR gate 13 and from thence to a bistable multivibrator 14 which switches state in response to a positive transition of the applied bipolar pulse signal. The initial positive transition of the bipolar pulse signal output of the limiter amplifier 12 switches the bistable multivibrator 14 into its positive output state such as is shown by waveform C in FIG. 2. This positive output state is applied to a gating circuit 15 to enable the transmission of the sinusoidal waveform applied to it, via lead 16, to the primary winding 18 of the coupling transformer 19. The coupling transformer 19 transmits this sinusoidal waveform to the secondary winding 23 which is coupled to the bridge nodes 21 and 22 of the bridge network 20. The positive transition of the output of the bistable multivibrator 14 is also applied to the oscilloscope sweep control input 24. This positive transition applied to the oscilloscope sweep control 24 initiates the sweep action therein simultaneously with the application of the test signal to the transmission line 41 to permit the accurate timing of detected signal reflections.

The next positive transition of the applied bipolar pulse signal switches the bistable multivibrator 14 into its zero output state. The zero output state of the bistable multivibrator 14 disables the gating circuit 15, and hence the sinusoidal signal applied thereto, via lead 16, is no longer transmitted to the transformer 19. Hence it is readily apparent that only a single-cycle of the sinusoidal waveform is applied to the bridge network 20.

The negative transition of the output of the bistable multivibrator 14 as it is switched into its zero output state is utilized to switch the monostable multivibrator 17 into its quasi stable state. The positive output of the monostable multivibrator 17 in its quasi stable state, as shown by waveform D in FIG. 2, is applied via the OR gate 13, to the input of the bistable multivibrator 14. The switching of the bistable multivibrator 14 in response to the bipolar pulse signal output of the limiter amplifier 12 is thus inhibited until the monostable multivibrator 17 again switches into its stable stage whereby, the next positive transition of the bipolar pulse signal switches the bistable multivibrator into its positive output stage thereby enabling the gating circuit 15.

The test signal waveform E shown in FIG. 2 is applied to the bridge network 20, via the coupling transformer 19 and its secondary winding 23. The test signal sine wave frequency is preferably chosen so that the highest components of the resulting spectrum are at the midpoint of the pass band of the coil-load or unoladed transmission line to be tested. In the case of the typical coil-loaded transmission line used in telephone service, this frequency is approximately 2 kHz. A suitable repetition rate of the single cycles of the sine wave for this coil-loaded telephone transmission line is found to be 125 Hz. The sine wave frequency and the repetition rate of the single cycles of the sine wave of the test signal determine the distribution of the fundamental and harmonic energy components of the test signal. With the above-described test signal frequency and repetition rate, the maximum energy component of the test signal occurs at 1625 Hz. with the harmonic signal energy components nearly completely attenuated above 4 kHz. The energy component frequency distribution is defined by the function sine $x/x^2$ as is shown in FIG. 3.

The concentration of test singal energy in the signal pass band of the transmission line 41 permits the test signal to successfully probe the transmission line 41 through all the load coils to its terminal point. The test signal having a complete cycle signal-cycle sine waveform contains no DC energy component, hence the transmission line may advantageously be DC isolated from the test apparatus by blocking capacitors.

It is apparent that the test signal 1 as applied to bridge node 21, is the inverse of the test signal 2 as applied to bridge node 22, inasmuch as they are connected to the opposite terminals of the secondary winding 23. The test signal 1 applied to node 21 is transmitted, via the test ratio arm 31, to the transmission line 41 under test. The test signal 2 applied to node 22 is transmitted, via the test ratio arm 32, to the artificial transmission line 42 which is assembled to match the known electrical characteristics of the transmission line 41. Hence the signal reflections generated by the artificial line 42 will be coincident in time, but opposite in polarity, to the corresponding signal reflections caused by the known impedance discontinuities of the transmission line 41. Hence only signal reflections due to unexpected discontinuities due to faults in the transmission line 41, which have no corresponding signal reflections due to the artificial line 42, unbalance the bridge voltage at node 25 and are hence displayed by the oscilloscope detector 45. These signal reflections due to faults are timed with respect to the time of the application of the test signal to the bridge network 20, which coincides with the start of the oscilloscope sweep, to determine the location of the fault.

It is readily apparent that the test signal cancellation feature advantageously permits the use of the test apparatus in testing unloaded transmission lines without test equipment modification, since the applied low frequency test signal is not displayed by the oscilloscope detector 45. It is also readily apparent that those skilled in the art can utilize the amplitude and phase of the test signal reflections to diagnose the kind and nature of detected faults.

It is to be understood that the above-described arrangement is merely illustrative of the numerous and varied other arrangements which may constitute applications of the principles of the invention. Such other arrangements may readily be devised without departing from the spirit and scope of this invention. The application of the invention is not limited to telephone transmission lines but has many other applications which are readily apparent to those skilled in the art.

What is claimed is:

1. A fault location testing arrangement comprising a bridge network including two reference branch arms and two test ratio arms, a coil loaded transmission line to be tested connected in one of said test ratio arms, an artificial transmission line having electrical characteristics identical to the design electrical characteristics of said coil loaded transmission line and connected in the other one of said test ratio arms, said bridge network balancing said coil loaded transmission line with said artificial transmission line, a test signal source including a sinusoidal waveform generator to generate a sinusoidal signal whose frequency is centered at the pass band frequency of said coil loaded transmission line, signal transmission gating means coupling said sinusoidal waveform generator and said bridge network, and a timing circuit to activate said signal transmission gating means at periodically recurring intervals having a duration of a single cycle of said sinusoidal waveform, said periodically recurring intervals spaced apart in time sufficiently to prevent the successive single cycle sinusoidal waveforms applied to said bridge network from interfering with signal reflections caused by discontinuities in said coil loaded transmission line, and including means to synchronize said periodically recurring interval with the zero crossings of said sinusoidal waveform and signal detection means connected to a common junction of the two reference arms and a common junction of the two test ratio arms.

2. A fault location testing arrangement as defined in claim 1 wherein said timing circuit comprises a limiter amplifier coupled to the output of said sinusoidal waveform generator, a bistable multivibrator, a monostable multivibrator, and a coincidence gate, the signal output of said monostable multivibrator and said limiter amplifier being applied to said coincidence gate whose output is coupled to the input of said bistable multivibrator, the signal output of said bistable multivibrator being applied to the input of said monostable multivibrator and to said signal transmission gate to enable signal transmission through said signal transmission gate whereby the limiter amplifier responds to zero crossings of the sinusoidal waveform to activate said bistable multivibrator and said monostable multivibrator disables said coincidence gate to delay a subsequent activation of said bistable multivibrator by a specified time interval.

3. A fault location testing arrangement as defined in claim 1 wherein said signal transmission gating means is connected to said bridge network by a coupling transformer having opposite terminals of its secondary coupled to a junction of one of said reference arms and test ratio arms and to a junction of the other of said reference arms and test ratio arms, respectively, to couple opposite polarities of the output of said gating means to said coil loaded transmission line and said artificial transmission line, whereby test signal reflections due to identical characteristics of said coil loaded transmission line and said artificial transmission line nullify each other and test signal reflections due to fault interruptions in said coil loaded transmission line unbalances said bridge arrangement.

References Cited

UNITED STATES PATENTS

| | | | |
|---|---|---|---|
| 1,395,854 | 11/1921 | Martin | 333—23 XR |
| 2,476,317 | 7/1949 | Nelson et al. | 324—52 |
| 2,490,377 | 12/1949 | MacLean | 324—52 XR |
| 2,493,800 | 1/1950 | Biskeborn | 324—52 |
| 2,611,805 | 9/1952 | Osborn et al. | 324—52 |
| 2,800,627 | 7/1957 | Oudin et al. | 324—52 |
| 3,031,643 | 4/1962 | Sheftelman | 324—52 XR |
| 3,244,978 | 4/1966 | Craven et al. | 324—52 XR |
| 3,255,406 | 6/1966 | Schluter | 324—52 |
| 3,281,674 | 10/1966 | Landgraf | 324—52 |

GERARD R. STRECKER, Primary Examiner

U.S. Cl. X.R.

179—175.3